United States Patent [19]
Maynard

[11] Patent Number: 5,173,015
[45] Date of Patent: Dec. 22, 1992

[54] IN-DIE TAPPING TOOL

[76] Inventor: Scott D. Maynard, 270 Cagney La., #304, Newport Beach, Calif. 92633

[21] Appl. No.: 823,205

[22] Filed: Jan. 21, 1992

[51] Int. Cl.⁵ ............................................. B23B 47/02
[52] U.S. Cl. ..................................... 408/137; 408/138
[58] Field of Search ............... 408/101, 102, 112, 137, 408/138; 10/139, 129 R, 129 A; 470/198

[56] References Cited

U.S. PATENT DOCUMENTS

| | | | |
|---|---|---|---|
| 2,314,138 | 3/1943 | Garbe et al. | 10/139 R |
| 2,346,297 | 4/1944 | Garbe | 10/129 R |
| 2,715,233 | 8/1955 | Clark | 408/124 |
| 4,449,868 | 5/1984 | Steinsberger et al. | 408/138 |
| 5,016,335 | 5/1991 | Becker et al. | 408/137 |

Primary Examiner—Daniel W. Howell
Attorney, Agent, or Firm—Hawes & Fischer

[57] ABSTRACT

An in-die tapping tool having particular application to a progressive die method for threading holes in a sheet metal workpiece. The tapping includes a transmission system comprising a threaded shaft assembly and a planetary roller nut. The roller nut is adapted to move axially along the shaft assembly in response to an impact force applied to the tapping tool during the downstroke of the press. The movement of the roller nut causes the shaft assembly to rotate, which rotation is imparted to a threaded lead screw to cause the lead screw to simultaneously rotate and ride axially along a threaded wall of a hollow cylindrical body. The rotational and axial movements of the lead screw through the cylindrical body are transferred to the tap to correspondingly induce a rotation and advancement of the tap towards the workpiece having the holes to be threaded. However, the axial location of the rotatable shaft assembly relative to the workpiece remains unchanged.

20 Claims, 9 Drawing Sheets

IN-DIE TAPPING TOOL

BACKGROUND OF THE INVENTION

1. Field of the Invention

This invention relates to a compact in-die tapping tool for threading holes in a sheet metal workpiece, which tool is particularly applicable to a progressive die method while advantageously eliminating the cost and inefficiency commonly associated with a secondary operation of having to move the workpiece to a drill press at a remote location at which the holes are threaded.

2. Background Art

As will be known to those skilled in the sheet metal industry, and particularly those familiar with progressive die methods, holes are initially punched in a sheet metal workpiece as one step of a progressive die method. It is then common to remove the workpiece to a (e.g. drill) press at a distant location so that the holes can be threaded as part of a secondary operation. The need for a secondary operation to thread the holes increases manufacturing time and handling requirements which correspondingly increases the cost of production.

The tapping tool of this invention may be easily located in and removed from a die that is used in a progressive die method, whereby to thread holes in a workpiece and eliminate the wasteful secondary step of having to remove the workpiece for threading at a remote location.

Tapping tools are commercially available in the sheet metal working art. However, such conventional tapping tools are generally characterized by large size, slow operation and high cost of manufacture. Consequently, such tools are not ideally suited for use in a progressive die method. One example of an efficient, relatively compact tapping tool that is adapted to be interfaced with a punch press is that described in U.S. Pat. No. 5,016,335 issued May 21, 1991. An important distinction between the patented tapping tool and the tapping tool of the present invention is the fact that the patented tool requires that a threaded shaft assembly be axially advanced towards a workpiece to thread the holes formed therein. However, the axial position of a threaded shaft assembly of the instant tapping tool is fixed, and the tap is advanced relative to the shaft assembly towards the workpiece.

SUMMARY OF THE INVENTION

In general terms, a compact in-die tapping tool is disclosed having particular application to a progressive die method for threading holes formed in a sheet metal workpiece. The tapping tool includes an end cap, a base and a pair of compression die springs extending therebetween. Projecting from the base towards the end cap of the tapping tool is a generally hollow cylindrical body. A shaft assembly is supported for rotation within the hollow body. The shaft assembly includes a threaded first end and a polygon-shaped opposite end. A planetary roller nut is coupled to and adapted to move axially along the threaded end of the shaft assembly. The roller nut is carried by a roller nut housing that is affixed to and movable with the end cap of the tool. The polygon end of the shaft assembly is received within a tap sleeve, one end of which is surrounded by and mated to a lead screw. The lead screw is mated to and movable along a correspondingly threaded wall at the interior of the hollow body. The opposite end of the tap sleeve is surrounded by a tap collet which releasably retains a tap within said tap sleeve. The tap collet is adapted to slide along the tap sleeve and against the bias of tap retention springs to permit the tap to be easily removed from the tap sleeve. Impact relief springs which are carried by the tap sleeve will be compressed to absorb any impact force applied to the tap and thereby avoid damage to the tap as a consequence of the tap contacting a solid workpiece rather than a hole formed in the workpiece.

In operation, after the tapping tool is located above the workpiece, an impact force is applied to the end cap of the tool during the downstroke of the press, whereby to move the end cap towards the base so as to compress the die springs therebetween. The movement of the end cap causes a corresponding movement of roller nut housing, such that the planetary roller nut carried by said housing moves axially along the threaded shaft end of the shaft assembly. Accordingly, the shaft assembly is caused to rotate, although the axial position thereof remains constant relative to the hollow cylindrical body. The rotation of the shaft assembly is imparted from the polygon end thereof to the tap sleeve, which rotation is, in turn, imparted to the lead screw. The rotation of the lead screw induces said screw to move along the threaded interior wall of the hollow cylindrical body so as to correspondingly cause the tap sleeve to slide along the polygon end of the shaft assembly. The movement of the tap sleeve along the polygon end advances the tap into a hole in the workpiece.

During the upstroke of the press, the impact force applied to the end cap of the tapping tool is removed, and the compression springs begin to expand. Therefore, the end cap is driven away from the base to correspondingly move the roller nut housing and the roller nut carried thereby away from the base. Accordingly, the shaft assembly is caused to rotate in the opposite direction, whereby the tap is withdrawn from the hole in the workpiece to await the subsequent downstroke of the press.

DESCRIPTION OF THE PREFERRED EMBODIMENT

Figure 1:
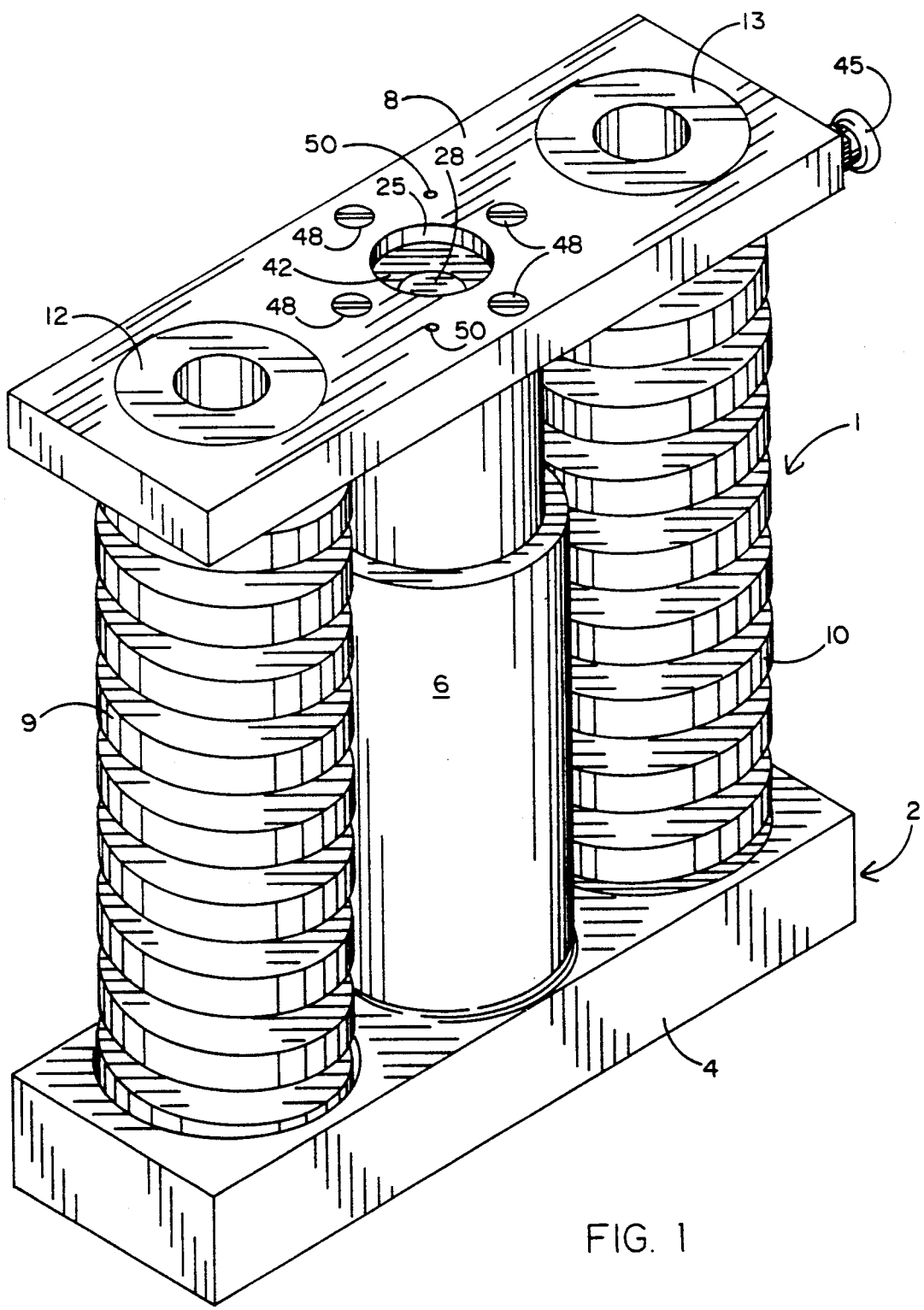
FIG. 1 is a perspective view of the in-die tapping tool which forms the present invention in an unloaded condition with no force applied thereto.
Figure 3:
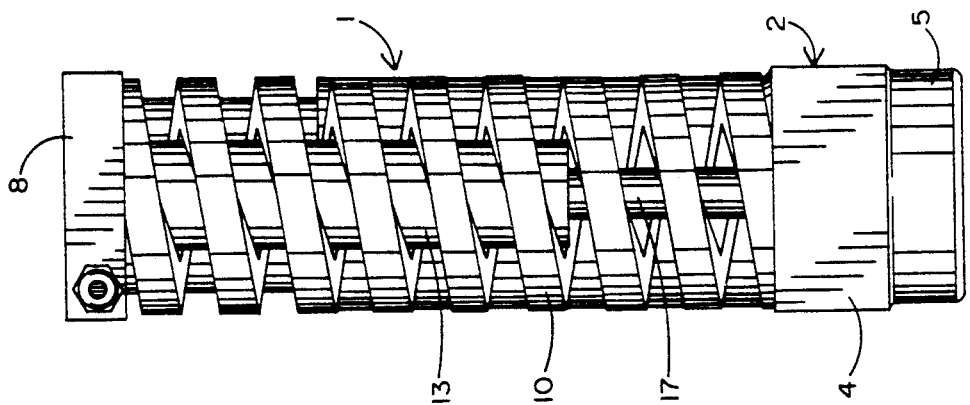
FIG. 3 is a side view of the tapping tool of FIG. 1.
Figure 2:
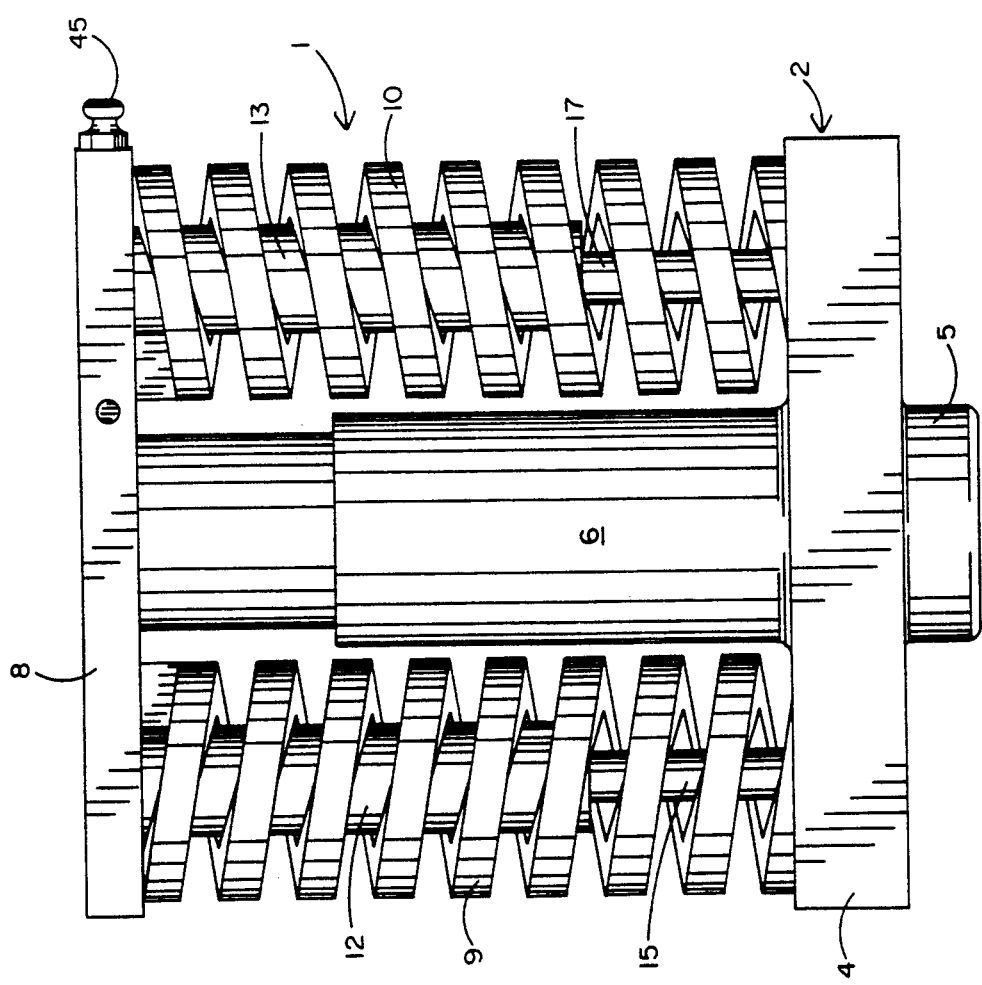
FIG. 2 is a front view of the tapping tool in FIG. 1.
Figure 4:
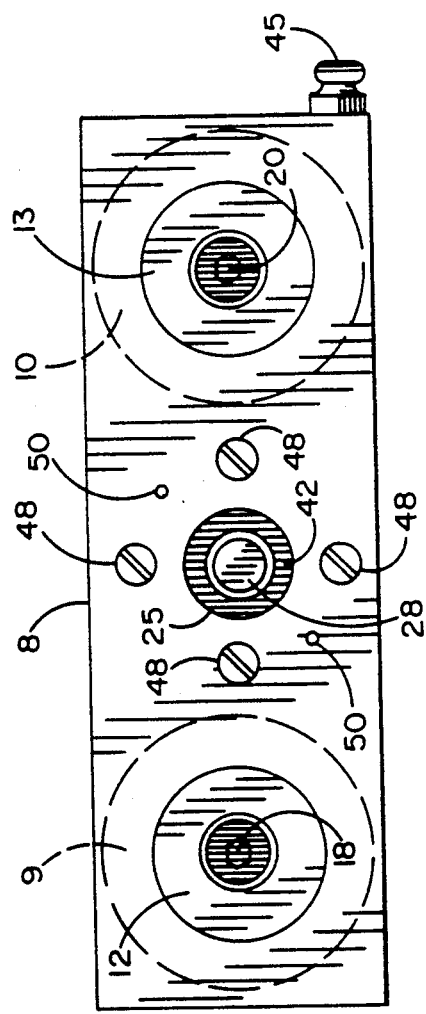
FIG. 4 is a top view of the tapping tool of FIG. 1.
Figure 5:
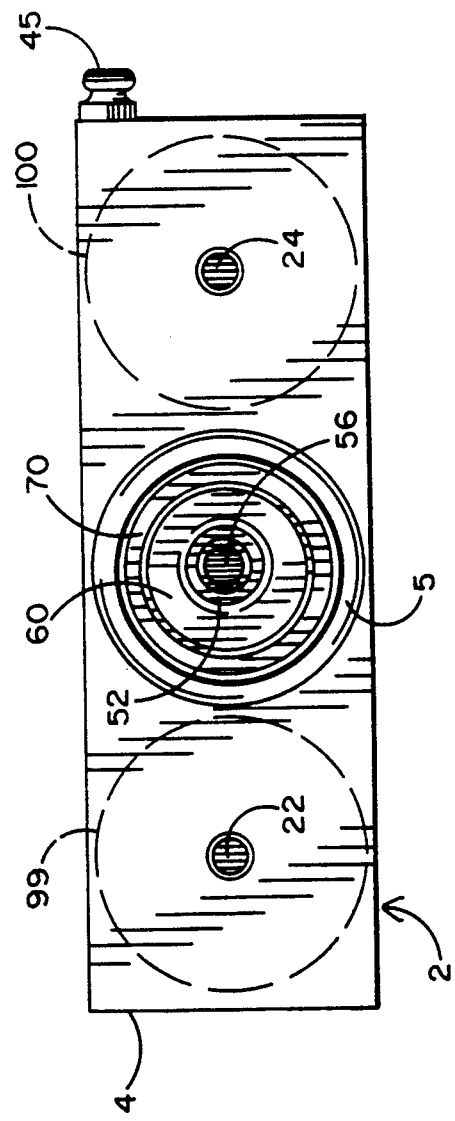
FIG. 5 is a bottom view of the tapping tool of FIG. 1.

The compact in-die tapping tool 1 which forms the present invention is best described while referring concurrently to FIGS. 1-6 of the drawings, where tool 1 is shown in the at rest or unloaded condition with no impact force being applied thereto. The tapping tool 1 is of the type that can be interfaced with a die at a commercially available press (not shown) from which an impact force is generated. Tapping tool 1 includes a main housing 2 comprising the coextensive connection of a generally flat base 4, a hollow cylindrical body 6 projecting upwardly from base 4, and a locating boss 5 projecting downwardly from base 4 to facilitate positioning the tool 1 in the die. In use, the base 4 of main housing 2 will typically be mounted on a well known spring lifter (also not shown). Spaced above the base 4 of main housing 2 and adapted to receive the impact force generated by the press is an end cap 8. A pair of helically wound compression die springs 9 and 10 (adapted to withstand approximately 600 pounds of pressure) extend between the base 4 and end cap 8. In their relaxed state, as shown, the springs 9 and 10 maintain the spacing of end cap 8 above the base 4 of main housing 2. The base 4 includes a pair of annular spring pockets (designated 99 and 100 in FIG. 8) that are disposed at opposite sides of cylindrical body 6. First ends of compression springs 9 and 10 are received in respective spring pockets 99 and 100. The opposite ends of springs 9 and 10 abut the underside of cap 8.

A pair of cylindrical spring sleeves 12 and 13 are coaxially aligned with and extend partially through respective compression springs 9 and 10. Stepped openings (designated 102 and 103 in FIG. 8) are formed through end cap 8 above springs 9 and 10, and lipped first ends of spring sleeves 12 and 13 are seated therewithin. Holes are formed through the opposite ends of sleeves 12 and 13, which ends terminate above base 4. A pair of shoulder screws 15 and 17 extend between respective spring sleeves 12 and 13 and the base 4 of main housing 2. That is, the shoulder screws 15 and 17 project through the holes in the ends of spring sleeves 12 and 13, such that screw heads 18 and 20 formed at first ends of shoulder screws 15 and 17 are seated within sleeves 12 and 13 to prevent the removal of the shoulder screws from the spring sleeves. The ends 22 and 24 of shoulder screws 15 and 17 opposite the screw heads 18 and 20 are screw threaded so as to be mated to correspondingly screw threaded receptacles formed in the base 4 of housing 2 (designated 104 and 105 in FIG. 8). As will soon be described, in the loaded condition of tapping tool 1, the spring sleeves 12 and 13 will slide along shoulder screws 15 and 17 such that heads 18 and 20 of screws 15 and 17 ride through said sleeves 12 and 13 whenever an impact force is applied to and removed from the end cap 8 of tapping tool 1.

Figure 6:
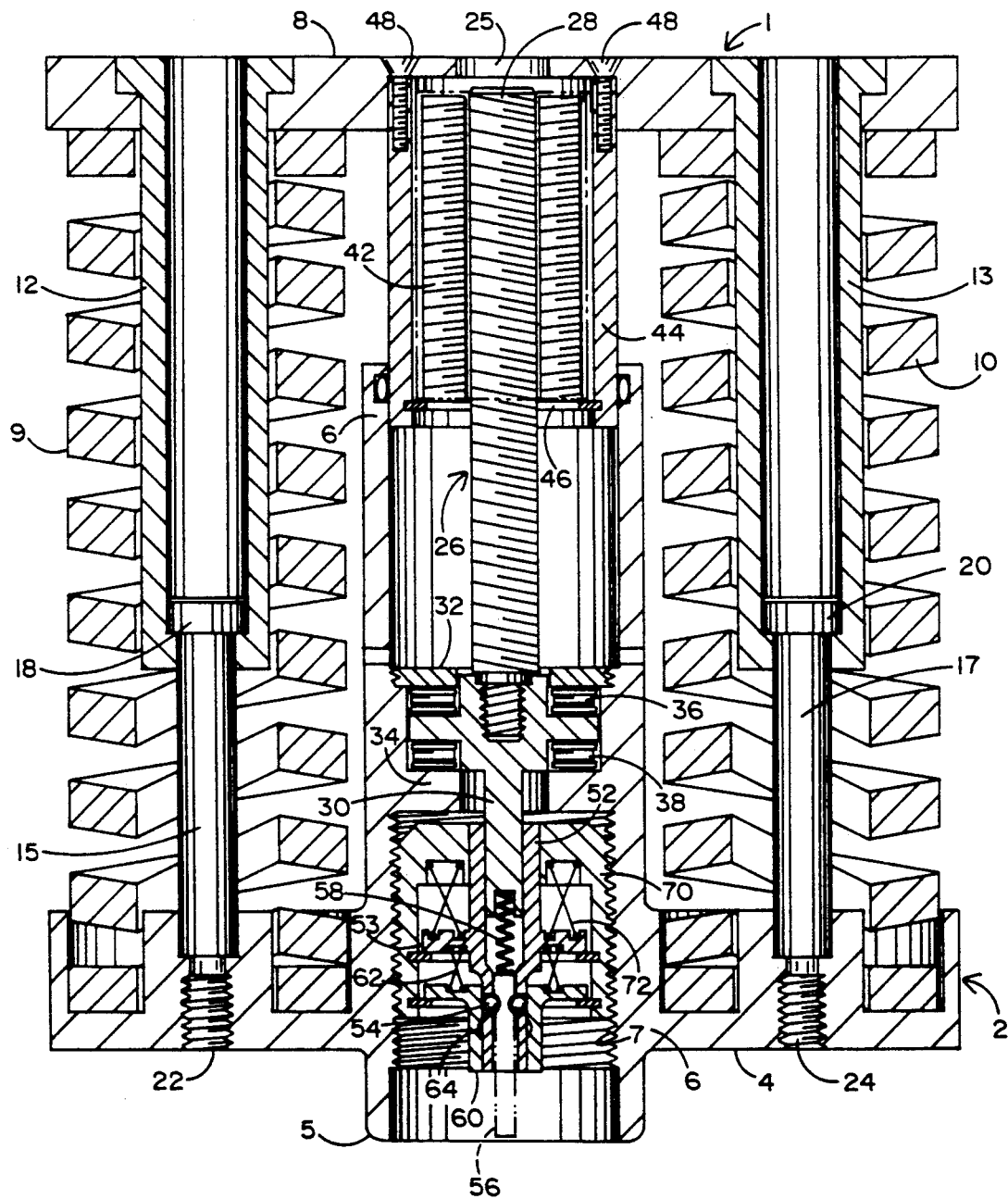
FIG. 6 is a cross section of the tapping tool of FIG. 1.

A shaft assembly 26 is supported in coaxial alignment with the cylindrical body 6 of main housing 2. As will soon be described, a clearance hole 25 is located in end cap 8 to accommodate shaft assembly 26 therethrough when an impact force is applied to said end cap to move cap 8 towards base 4. Referring particularly to FIG. 6 of the drawings, the shaft assembly 26 is shown including an elongated, left-handed, screw-threaded shaft 28 at one end that is detachably mated to a polygon shaped opposite end 30. As will be described in greater detail while referring to FIG. 7, the shaft assembly 26 is supported for rotation by upper and lower thrust bearing assemblies 36 and 38 that surround the polygon end 30 of assembly 26 between a bearing cap 32 and a radially inward extending bearing seat 34 of cylindrical body 6.

Continuing to refer to FIG. 6, a commercially available planetary roller nut 42 is shown surrounding the threaded end 28 of shaft assembly 26. Roller nut 42 is adapted to move axially along the threaded shaft end 28 through the interior of hollow cylindrical body 6. By way of example, the planetary roller nut 42 is available from SKF Corporation. Tapping tool 1 is provided with an optional grease fitting 45 through which grease may be supplied to lubricate roller nut 42. The roller nut 42 is surrounded by a roller nut housing 44 and seated upon a retaining ring 46 that is affixed to and extends around the bottom of housing 44. A plurality of (e.g. four) flush head cap screws 48 extend through holes in the end cap 8 of tapping tool 1 for receipt within corresponding holes formed in the roller nut housing 44. Similarly, a pair of dowel pins 50 (best shown in FIGS. 1 and 4) extend through holes in the end cap 8 for receipt within corresponding holes formed in the roller nut housing 44. In this manner, the end cap 8 and housing 44 are connected together such that an axial displacement of said end cap against the bias of compression springs 9 and 10 and in response to an impact force applied by the press will cause roller nut housing 44 to move downwardly through cylindrical body 6. The roller nut 42 is carried by roller nut housing 44 so as to be moved downwardly along the threaded shaft 28 of shaft assembly 26.

Figure 7:
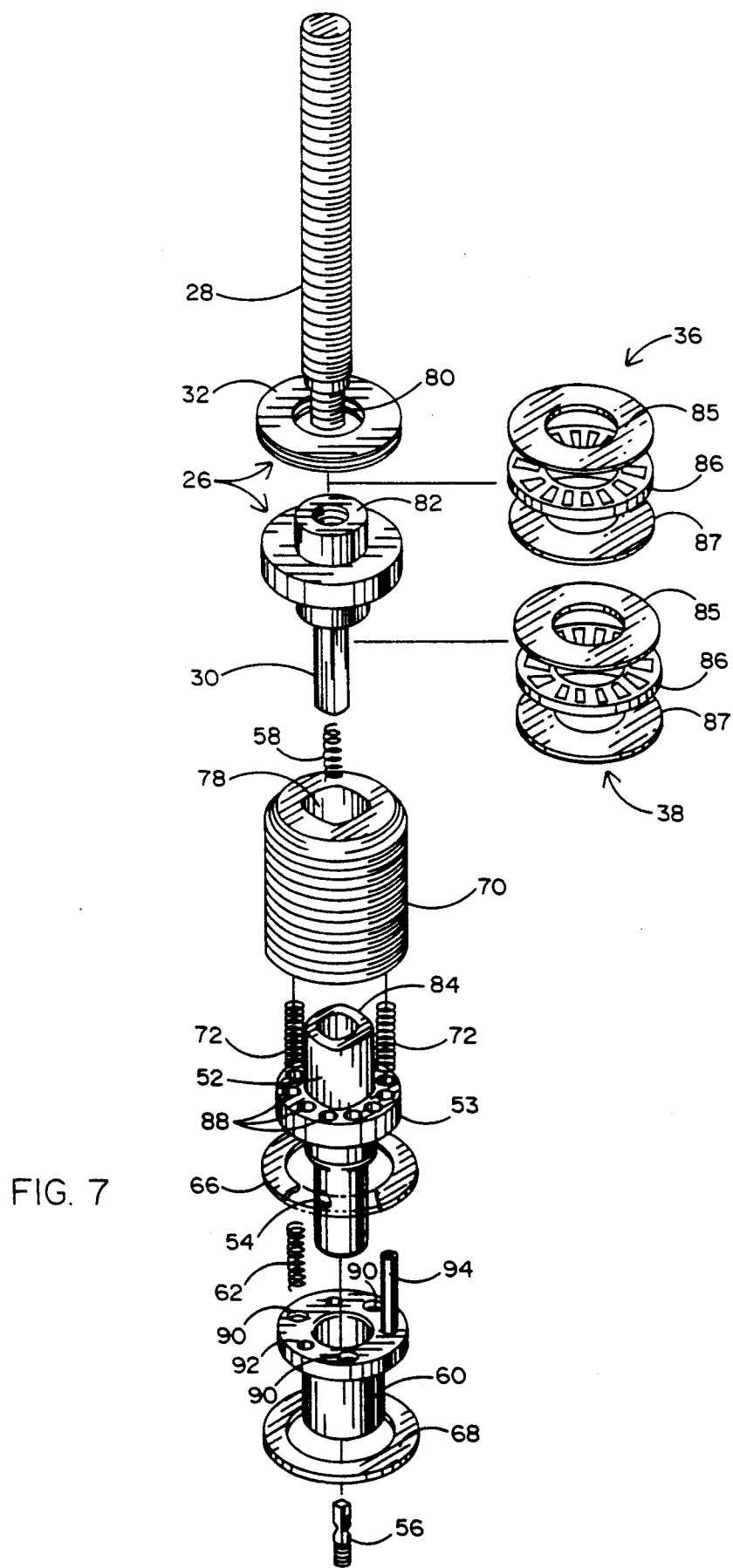
FIG. 7 is an exploded view of a transmission assembly of the tapping tool of FIG. 1 by which a tap is advanced towards a hole in a workpiece.

Referring now FIGS. 6 and 7 of the drawings, the polygon end 30 of shaft assembly 26 is shown received within a hollow cup 84 at one end of a tap sleeve 52. The opposite end of the tap sleeve 52 includes a pair of opposing holes to receive respective tap balls 54 which are adapted to exert a compressive force and thereby releaseably retain a ¾ inch tap 56 within tap sleeve 52. A helical tap ejection spring 58 is normally compressed between the polygon end 30 of shaft assembly 26 and the tap 56 to bias said tap for ejection from tap sleeve 52 in the event that the tap retaining balls 54 are displaced radially outward from sleeve 52 (as is best shown in FIG. 12) so that the force exerted by balls 54 on tap 56 will be eliminated.

To this end, a hollow tap collet 60 surrounds the end of tap sleeve 52 within which the tap 56 is releaseably retained by tap retaining balls 54. The tap collet 60 urges the tap retaining balls radially inward of the tap sleeve 52 to apply the compressive force necessary to prevent the removal of the tap 56. A plurality of tap retention springs 62 are disposed between spring pockets 90 formed in the tap collet 60 and opposing spring pockets (designated 75 in FIG. 9) formed in the underside of a spring support base 53 of tap sleeve 52. The tap retention springs 62 bias the tap collet 60 to an axially advanced position relative to the tap sleeve 52 at which to urge the tap retaining balls 54 inwardly of said tap sleeve. However, the tap collet 60 is provided with an annular tap relief groove 64 which is sized to receive therein the tap retaining balls 54.

Figure 12:
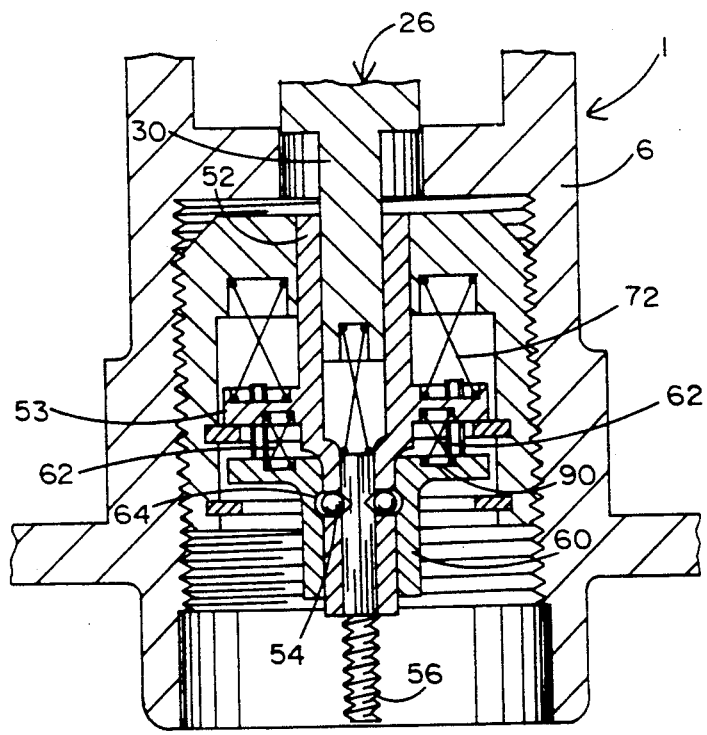
FIG. 12 illustrates a detail of the tapping tool by which to permit a tap to be removed therefrom.

More particularly, and as is best shown in FIG. 12, a manual force applied to the tap collet 60 will cause collet 60 to slide upwardly along tap sleeve 52 and against the bias of tap retention springs 62 to an axially retracted position relative to said tap sleeve 52. At the axially retracted position of tap collet 60, the tap retention springs 62 are compressed and the tap relief groove 64 in collet 60 is aligned with the tap retaining balls 54. Accordingly, the balls 54 will move radially outward of the tap sleeve 52 so as to fall into relief groove 64 in tap collet 60 and thereby release the tap 56 for removal from tap sleeve 52. After the tap 56 has been removed, the tap retention springs 62 will expand to automatically return tap collet 60 to its axially advanced position relative to tap sleeve 52. A new tap is inserted into tap sleeve 52 by following the same procedure as just described for removing the existing tap.

Referring once again to FIGS. 6 and 7, a first retaining ring 66 surrounds the tap sleeve 52 to provide support for the spring support base 53 thereof. A second tap retaining ring 68, which is aligned parallel with and spaced axially from the first retaining ring 66 surrounds the tap collet 60 to provide support therefor. Each of the retaining rings 66 and 68 is affixed to and carried by a hollow, cylindrical lead screw 70 which surrounds both the tap sleeve 52 and tap collet 60.

Figure 13:
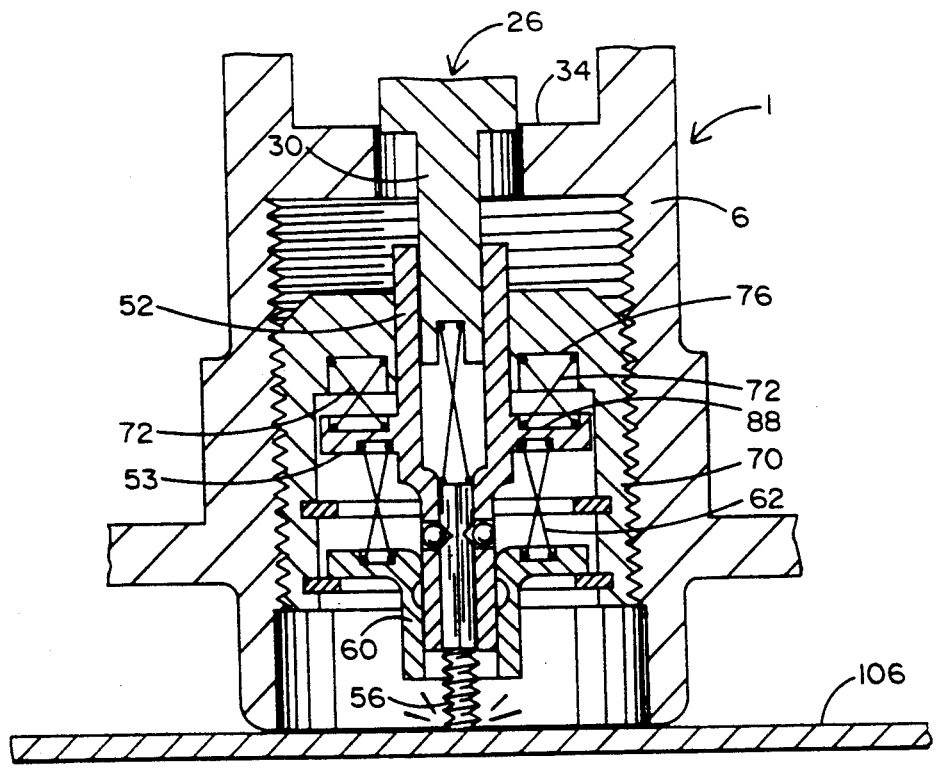
FIG. 13 illustrates a detail of the tapping tool by which to avoid damage in the event that the tap strikes the workpiece, rather than a hole formed therein.

Lead screw 70 has a threaded outer wall that is mated to a correspondingly threaded wall 7 at the interior of the cylindrical body 6 of main housing 2. As will be explained when referring to FIG. 11, lead screw 70 is adapted to be moved axially through cylindrical body 6 for advancing the tap sleeve 52 and the tap 56 retained therein towards a hole formed in a workpiece. A set of impact relief springs 72 extend from spring pockets 76 formed in the lead screw 70 to corresponding spring pockets (designated 88 in FIG. 9) formed in the top of the spring support base 53 of tap sleeve 52. As will be explained when referring to FIG. 13, the tap sleeve 53 is adapted to recoil along the polygon end 30 of shaft assembly 26 and against the normal bias of impact relief springs 72 in the event that the tap 56 is inadvertently advanced into contact with a solid workpiece, rather than a hole formed therein. A cavity 78 is formed through lead screw 70 to permit said lead screw to be coupled to tap sleeve 52, as will now be described.

Referring particularly to FIG. 7 of the drawings, a transmission system is disclosed by which the rotation of shaft assembly 26 is converted into the axial advancement of the tap 56 whereby to thread a hole formed in a workpiece. As was earlier disclosed, shaft assembly 26 includes a screw threaded end 28 that is detachably mated to a polygon end 30. That is, the threaded end 28 has a threaded male plug 80 that is adapted to be received in a correspondingly threaded female receptacle 82 of polygon end 30. However, and in the alternative, the threaded end 28 and opposite polygon end 30 of shaft assembly 26 can be coextensive to one another, such that assembly 26 is manufactured as a unitary member, as opposed to a pair of shaft sections that are detachably connected together.

The polygon end 30 of shaft assembly 26 is received within a correspondingly shaped cup 84 at one end of tap sleeve 52. The cup end 84 of tap sleeve 52 is then received within the cavity 78 of lead screw 70. In this manner, a rotation of the shaft assembly 26 is imparted from the polygon end 30 thereof to the tap sleeve 52, which rotation is, in turn, imparted to the lead screw 70. Accordingly, and by virtue of its threaded exterior, the lead screw 70 will ride axially along the correspondingly threaded wall 7 of the cylindrical body 6 of main housing 2 (best shown in FIG. 11) to advance tap sleeve 52 through body 6 and towards the workpiece.

As was previously disclosed, the shaft assembly 26 is supported for rotation around its longitudinal axis by upper and lower thrust bearing assemblies 36 and 38 that surround the polygon end 30 between bearing cap 32 and the bearing seat 34 of cylindrical body 6. Each thrust bearing assembly 36 and 38 includes a thrust bearing 48 sandwiched between upper and lower thrust washers 85 and 87.

The tap sleeve 52 includes spring support base 58 extending around the periphery thereof. A plurality of (e.g. 10) spring pockets 88 are formed in the top of spring support base 53 for receiving respective ends of a corresponding plurality of impact relief spring 72 (only two of which are shown). The opposite ends of impact relief spring 72 are received within corresponding spring pockets (designated 76 in FIG. 9) formed in lead screw 70. Similarly, a plurality of (e.g. three) spring pockets 90 are formed in the tap collet 60 for receiving respective ends of a corresponding plurality of tap retention spring 62 (only one of which is shown). The opposite ends of tap retention spring 62 are received within respective spring pockets (designated 75 in FIG. 9) formed in the underside of the spring support base 53 of tap sleeve 52. A pair of pin holes 92 are formed in the tap collet 60. A pair of dowel pins 94 (only one of which is shown) extend between respective pin holes 92 and similar holes (not shown) formed in the underside of spring support base 53. Dowel pins 94 prevent the rotation of tap sleeve 52 relative to tap collet 60.

Figure 8:
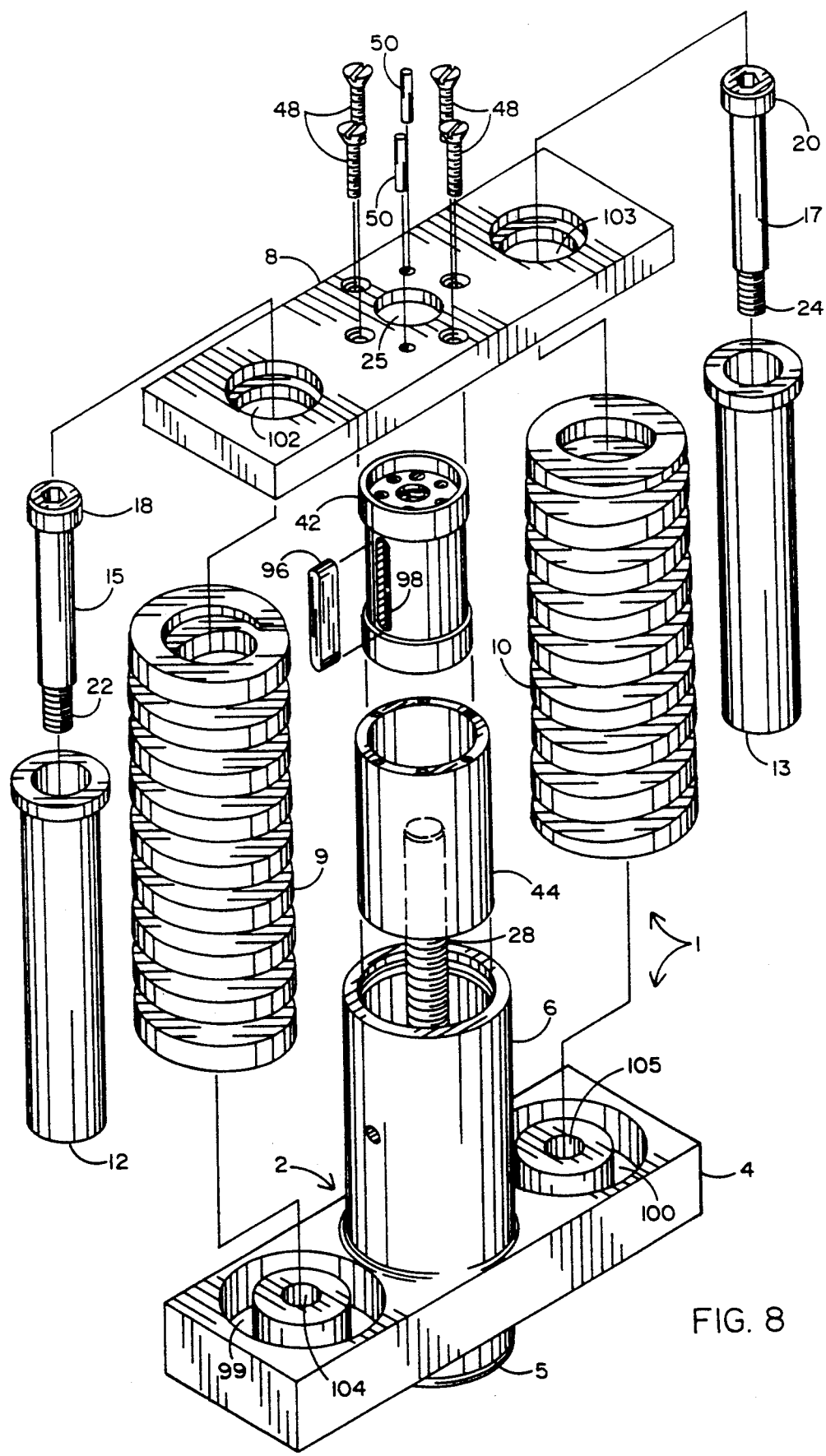
FIG. 8 is an exploded view of the tapping tool of FIG. 1.

FIG. 8 of the drawings shows an exploded view of the tapping tool 1. The compression springs 9 and 10 are shown extending between end cap 8 and respective spring pockets 99 and 100 formed in the base 4 of main housing 2. Spring sleeves 12 and 13 extend downwardly and partially through compression springs 9 and 10 from stepped openings 102 and 103 formed in the end cap 8. The shoulder screws 15 and 16 extend through holes at the bottom of spring sleeves 12 and 13, and screw threaded ends 22 and 24 thereof are received in threaded receptacles 104 and 105 formed in the base 4. The threaded shaft end 28 of shaft assembly 26 is mated to planetary roller nut 42 below clearance hole 25 in end cap 8. The roller nut housing 44 which surrounds the roller nut 42 is affixed to the underside of end cap 8 by means of tap screws 48 and dowel pins 50. A key 96 extends from receipt in a keyhole 98 formed in roller nut 42 to an opposing keyhole (not shown) formed in the roller nut housing 44 to prevent the rotation of roller nut 42 relative to housing 44 as roller nut 42 moves axially along shaft assembly 26.

Figure 9:
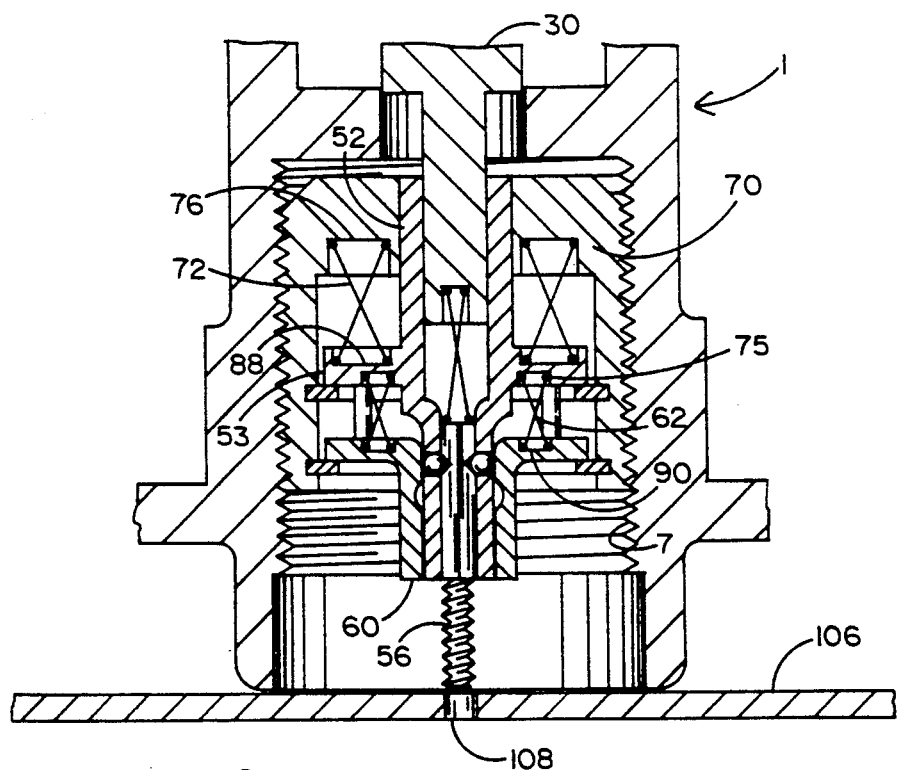
FIG. 9 illustrates a detail of the tapping tool of FIG. 1 in the unloaded condition with no force applied thereto.
Figure 10:
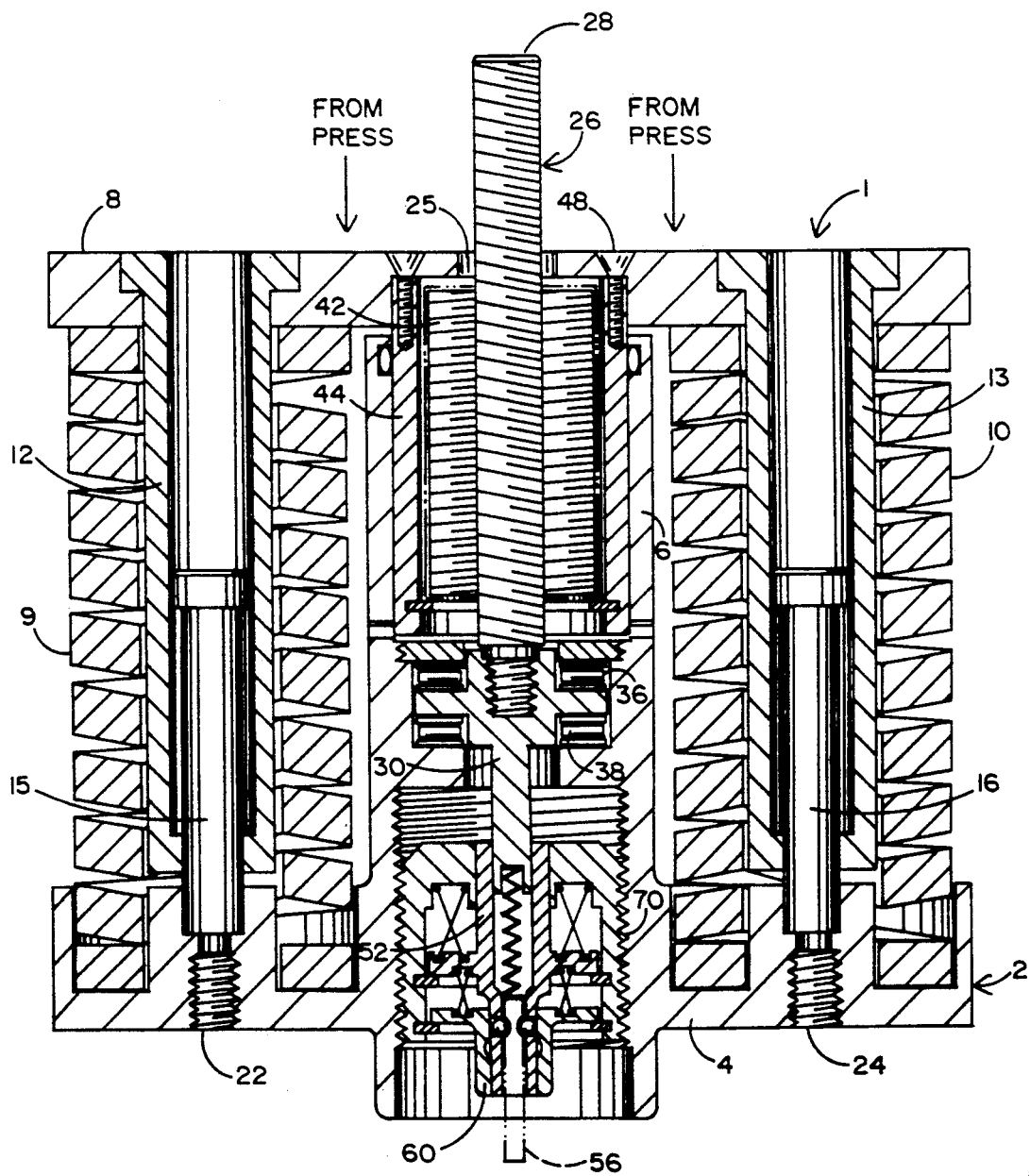
FIG. 10 is a cross section of the tapping tool in the loaded condition with a force applied thereto.

The operation of the in-line tapping tool 1 of the present invention is now described while referring to FIGS. 9 and 10 of the drawings. During the downstroke of the press, the tapping tool 1 is first moved downwardly and into contact with a sheet metal workpiece 106, such that the tap 56 is spaced above the hole 108 to be threaded (best shown in FIG. 9). Next, an impact force is applied by the press to the tool 1 at the end cap 8 thereof, whereby end cap 8 is forced towards the base 4 of main housing 2. As end cap 8 moves towards base 4, the die springs 9 and 10 are compressed therebetween. The spring sleeves 12 and 13, first ends of which are attached to the end cap 8, also move towards base 4 and ride downwardly along shoulder screws 15 and 16, the threaded ends 22 and 24 of which are attached to said base 4. Likewise, the roller nut housing 44, which is attached to end cap 8 by means of cap screws 48, will move downwardly through the cylindrical body 6 of main housing 2, and the planetary roller nut 42 will correspondingly move downwardly along the threaded end 28 of shaft assembly 26.

As an important distinction between the tapping tool 1 of this invention and conventional tapping tools, shaft assembly 26 does not move axially through cylindrical body 6 and towards workpiece 106 as end cap 8 moves towards the base 4 of main housing 2. Thus, as end cap 8 is moved toward base 4 in response to an impact force generated by the press, the threaded end 28 of assembly 26 will project outwardly through the clearance hole 25 in cap 8 (best shown in FIG. 10). Nevertheless, the movement of end cap 8 towards base 4 will cause threaded end 28 to be rotated around its longitudinal axis, whereby to advance the tap 56 axially towards workpiece 106. More particularly, the movement of end cap 8 causes a corresponding movement of the roller nut housing 44 towards base 4, such that the threaded roller nut 42 will move downwardly along the threaded shaft end 28 of shaft assembly 26. The axial displacement of threaded nut 42 along the threaded shaft end 28 is converted into a rotation of the shaft assembly 26. However, the axial position of shaft assembly 26 relative to the cylindrical body 6 of main frame 2 remains unchanged.

As earlier disclosed, the shaft assembly 26 is supported for rotation by upper and lower thrust bearing assemblies 36 and 38. The rotation of the threaded shaft end 28 of shaft assembly 26 causes a corresponding rotation of the polygon end 30 at the opposite end of assembly 28. The rotation of the polygon end 30 is imparted to the tap sleeve 52, inasmuch as polygon end 30 is received within the cup (designated 84 in FIG. 7) of the tap sleeve 52. The rotation imparted to tap sleeve 52 is, in turn, imparted to lead screw 70, inasmuch as the tap sleeve 52 is received within and mated to the cavity (designated 78 in FIG. 7) of lead screw 70. The lead screw 70 and the tap 56 are machined with the same pitch. Accordingly, the rotation of lead screw 70 will induce said lead screw to move axially and downwardly along the threaded wall 7 at the interior of cylindrical body 6. The axial movement of lead screw 70 through body 6 causes a corresponding axial movement of tap sleeve 52, such that said tap sleeve slides downwardly along the polygon end 30 of shaft assembly 36. Thus, the tap which is retained by tap sleeve 52 is advanced toward the workpiece while being rotated by the shaft assembly 26.

Figure 11:
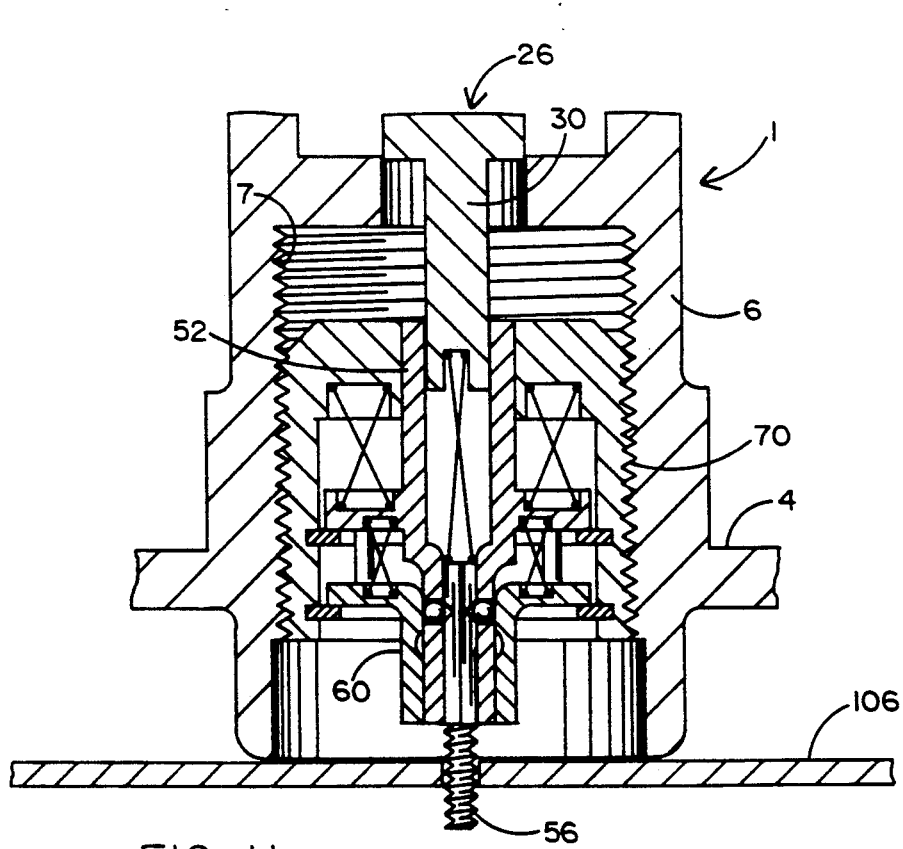
FIG. 11 illustrates a detail of the tapping tool in the loaded condition with a tap advanced into a hole in the workpiece.

FIG. 11 of the drawings shows the in-die tapping tool 1 at the end of the downstroke of the press with the lead screw 70 moved downwardly through the cylindrical body 6 and the tap sleeve 52 moved downwardly along the polygon end 30 of shaft assembly 26, whereby the tap 56 is advanced outwardly of body 6 and into a hole in workpiece 106. Being that the tap 56 is simultaneously rotated and advanced, the hole in workpiece 106 will be threaded as the tap is received therewithin.

At the conclusion of the downstroke of the press, the impact force applied to the tapping tool 1 is terminated. Therefore, the compression springs (designed 9 and 10 in FIG. 10), which were previously compressed during the downstroke of the press, begin to expand during the upstroke, so as to return tapping tool 1 to its at rest, unloaded condition of FIG. 6. More particularly, the end cap 8 of tool 1 is moved by springs 9 and 10 upwardly and away from the base 4. The roller nut housing 44 is moved upwardly with the end cap 8 and the retaining ring (designated 46 in FIG. 6) of housing 44 urges the planetary roller nut 42 axially and upwardly along the threaded end 28 of shaft assembly 26. Accordingly, the threaded end 28 is caused to rotate in a reverse direction relative to its rotation during the downstroke of the press. The reverse rotation of threaded end 28 is imparted to tap sleeve 52 via polygon end 30, which rotation is, in turn, imparted to lead screw 70. Hence, lead screw 70 will move upwardly along the threaded wall 7 of cylindrical body 6 to correspondingly cause tap sleeve 52 to slide upwardly along the polygon end 30 of shaft assembly 26, such that the tap 56 carried by sleeve 52 will be removed from the workpiece and retracted axially and upwardly into body 6 until the next downstroke of the press.

As with the downstroke of the press, it may be appreciated that the shaft assembly 26 rotates during the upstroke, but the axial position of assembly 26 relative to the cylindrical body 6 of housing 2 remains constant. However, roller nut 42 moves axially along the threaded end 28 to cause the shaft assembly 26 to rotate so as to cause the tap 56 to be retracted from the workpiece and into cylindrical body 6.

As earlier indicated, the tapping tool 1 is adapted to avoid damage during the downstroke of the press as a consequence of the tap 56 inadvertently striking a solid section of the workpiece 106, rather than being received in a hole formed therein. More particularly, and referring now to FIG. 13 of the drawings, in the event that the tap 56 is advanced downwardly through body 6 and into contact with the workpiece 106 where no hole is located, the lead screw 70 will continue to rotate and move downwardly around the tap sleeve 52. When the tap 56 contacts the workpiece 106, the impact relief springs 72 will be compressed between the spring pockets 88 in spring support base 53 of tap sleeve 52 and the spring pockets 76 of lead screw 70 in which springs 72 are received. The impact relief springs 72 help to absorb the impact force and thereby dissipate any shock applied to the tap 56 and the tap sleeve 52 in which said tap is carried. When the tapping tool 1 is eventually raised from the workpiece 106 during the upstroke of the press, the impact relief spring 72 will expand, and the tap 56 will be positioned relative to workpiece 106 for threading a new hole in the workpiece 106 during a subsequent downstroke of the press.

It will be apparent that while a preferred embodiment of the invention has been shown and described, various modifications and changes may be made without departing from the true spirit and scope of the invention. For example, while the in-line tapping tool of the present invention has been described as having particular application to a progressive die method, it is to be understood that the tapping tool may also be used in other press applications including, but not limited to, pneumatic, hydraulic, and mechanical presses or wherever it is desirable to thread a hole by means of a pressing action as opposed to a separate drilling action.

What is claimed is:

1. A tapping tool for threading a hole in a workpiece and comprising:

an end cap to which an impact force is to be applied;
a base spaced from said end cap;
spring means located between said end cap and said base, said end cap adapted to be moved towards said base and against the normal bias of said spring means when an impact force is applied to said end cap;

shaft means having a threaded end and extending between said end cap and said base;

a planetary roller nut coupled to and adapted to move axially along the threaded end of said shaft means to cause said shaft means to rotate when said end cap is moved towards said base;

tap carrying means retaining a tap at one end thereof and being coupled to said shaft means at the opposite end, such that a rotation of said shaft means is imparted to said tap carrying means; and means responsive to the rotation of said tap carrying means for advancing said tap carrying means axially relative to said shaft means and towards the hole in the workpiece.

2. The tapping tool recited in claim 1, wherein said shaft means has a polygon end opposite said threaded end, said polygon end coupled to said tap carrying means so that the rotation of said shaft means is imparted to said tap carrying means.

3. The tapping tool recited in claim 2, wherein said tap carrying means includes a sleeve in which to receive the polygon end of said shaft means, whereby said polygon end is coupled to said tap carrying means.

4. The tapping tool recited in claim 3, wherein the means responsive to the rotation of said tap carrying means for advancing said tap carrying means axially relative to said shaft means includes a lead screw coupled to said tap carrying means and rotatable therewith.

5. The tapping tool recited in claim 4, wherein said lead screw has a cavity formed therein in which to receive the sleeve of said tap carrying means so as to couple said lead screw to said tap carrying means, such that the rotation of said tap carrying means is imparted to said lead screw.

6. The tapping tool recited in claim 5, further comprising a hollow cylindrical body extending from said base towards said end cap and having a threaded wall at the interior thereof, said lead screw coupled to said cylindrical body such that the rotation imparted to said lead screw from said tap carrying means causes said lead screw to move axially along the threaded wall of said cylindrical body for correspondingly advancing said tap carrying means axially relative to the polygon end of said shaft means and towards the hole in the workpiece.

7. The tapping tool recited in claim 1, further comprising a roller nut housing connected to said end cap and carrying said planetary roller nut, such that a movement of said end cap towards said base causes said roller nut to move axially along the threaded end of said shaft means.

8. The tapping tool recited in claim 1, further comprising means to support said shaft means for rotation around the longitudinal axis thereof, the axial position of said shaft means relative to the workpiece remaining unchanged.

9. The tapping tool recited in claim 1, further comprising a tap collet surrounding said tap carrying means and applying a force to retain the tap within said tap carrying means, said tap collet being slidable axially along said tap carrying means to release said tap therefrom.

10. The tapping tool recited in claim 1, further comprising a plurality of guide sleeves having first ends connected to said end cap and opposite ends spaced above said base, and shoulder screws having first ends connected to said base and opposite ends received within and riding through respective guide sleeves when said end cap is moved towards said base.

11. The tapping tool recited in claim 10, wherein said spring means between said end cap and said base are helical compression springs, said guide sleeves being coaxially aligned with and extending axially through respective ones of said compression springs.

12. A tapping tool for threading a hole in a workpiece, comprising:

a base;

an end cap to which an impact force is applied, said end cap movable towards said base when an impact force is applied thereto;

shaft means having first and opposite ends, said first end being threaded;

a planetary roller nut moving axially along the threaded end of said shaft means when said end cap is moved towards said base to cause said shaft means to rotate; and tap carrying means retaining a tap and being coupled to said shaft means at the opposite end thereof so that the rotation of said shaft means is imparted to said tap carrying means, said tap carrying means adapted to slide axially over said opposite end of said shaft means and towards the workpiece in response to the rotation of said shaft means for correspondingly advancing the tap towards the hole in the workpiece.

13. The tapping tool recited in claim 12, further comprising means to support said shaft means for rotation about the longitudinal axis thereof, the axial position of said shaft means relative to the workpiece remaining constant.

14. The tapping tool recited in claim 12, further comprising a roller nut housing connected to said end cap and movable therewith towards said base, said roller nut housing carrying said planetary roller nut such that said roller nut moves axially along the threaded end of said shaft means when said end cap moves towards said base.

15. The tapping tool recited in claim 12, wherein said shaft means has a polygon opposite end and said tap carrying means includes a sleeve in which to receive said polygon end of said shaft means, whereby to couple said tap carrying means to said shaft means so that a rotation of said shaft means is imparted to said tap carrying means.

16. The tapping tool recited in claim 15, further comprising a lead screw having a cavity formed therein in which to receive the sleeve of said tap carrying means in order to couple said lead screw to said tap carrying means, such that the rotation of said tap carrying means is imparted to said lead screw.

17. The tapping tool recited in claim 16, further comprising a hollow cylindrical body extending from said base towards said end cap and having threads formed at an interior wall thereof, said lead screw coupled to said cylindrical body such that the rotation imparted to said lead screw from said tap carrying means causes said lead screw to rotate around and move axially along the threaded wall of said cylindrical body for correspondingly advancing said tap carrying means axially relative to the polygon end of said shaft means and towards the workpiece.

18. The tapping tool recited in claim 12, further comprising a tap collet surrounding said tap carrying means and applying a force to retain the tap within said tap carrying means, said tap collet being slidable axially along said tap carrying means to release said tap therefrom.

19. A tapping tool to be interfaced with a press to receive an impact force generated by the press and to thread holes formed in a workpiece in response to the impact force, said tapping tool comprising:
  a base;
  an end cap spaced from said base and receiving the impact force generated by the press for moving said end cap towards said base;
  a hollow body extending from said base towards said end cap and having a threaded interior wall;
  shaft means having a threaded portion;
  means for supporting said shaft means for rotation within said hollow body, such that the axial position of said shaft means relative to said body remains constant;
  a threaded planetary roller nut coupled to said shaft means and adapted to move axially along the threaded portion thereof in response to the movement of said end cap to cause said shaft means to rotate when said end cap is moved towards said base;
  tap carrying means retaining a tap and being coupled to said shaft means such that a rotation of said shaft means is imparted to said tap carrying means to cause said tap carrying means to rotate; and
  threaded means coupled to said tap carrying means such that the rotation of said tap carrying means is imparted to said threaded means to cause said threaded means to rotate around and move axially along the threaded wall of said hollow body for advancing said tap carrying means towards the workpiece.

20. A tapping tool for threading a hole in a workpiece and comprising:
  an end cap to which an impact force is to be applied;
  a base spaced from said end cap;
  spring means located between said end cap and said base, said end cap adapted to be moved towards said base and against the normal bias of said spring means when an impact force is applied to said end cap;
  shaft means extending between said end cap and said base;
  means coupled to said shaft means to cause said shaft means to rotate when said end cap is moved towards said base;
  tap carrying means retaining a tap at one end thereof and being coupled to said shaft means at the opposite end, such that a rotation of said shaft means is imparted to said tap carrying means;
  a tap collet surrounding said tap carrying means and applying a compressive force to retain the tap within said tap carrying means, said tap collet being slidable axially along said tap carrying means to remove the compressive force and release said tap therefrom; and
  means responsive to the rotation of said tap carrying means for advancing said tap carrying means axially relative to said shaft means and towards the hole in the workpiece.

* * * * *